(12) United States Patent
Kashiwagi et al.

(10) Patent No.: US 8,173,759 B2
(45) Date of Patent: May 8, 2012

(54) ORGANOPOLYSILMETHYLENE AND A COMPOSITION COMPRISING THE SAME

(75) Inventors: Tsutomu Kashiwagi, Annaka (JP); Toshio Shiobara, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 75 days.

(21) Appl. No.: 12/861,283

(22) Filed: Aug. 23, 2010

(65) Prior Publication Data

US 2011/0046310 A1 Feb. 24, 2011

(30) Foreign Application Priority Data

Aug. 21, 2009 (JP) .................................. 2009-191754

(51) Int. Cl.
  *C08L 83/04* (2006.01)
  *C08G 77/06* (2006.01)
(52) U.S. Cl. ............ 528/35; 525/477; 525/478; 528/15; 528/31; 528/32
(58) Field of Classification Search .................. None
  See application file for complete search history.

(56) References Cited

U.S. PATENT DOCUMENTS

| | | | |
|---|---|---|---|
| 5,087,720 A | | 2/1992 | Kishita et al. |
| 5,247,046 A | * | 9/1993 | Takago et al. .................. 528/15 |
| 5,531,929 A | * | 7/1996 | Kobayashi .................... 516/116 |
| 5,763,540 A | | 6/1998 | Nakata et al. |
| 6,034,225 A | * | 3/2000 | Weidner et al. ............... 534/730 |
| 6,492,480 B1 | | 12/2002 | Nagashima et al. |
| 6,534,587 B1 | | 3/2003 | Tapsak et al. |
| 6,787,191 B2 | * | 9/2004 | Hanahata et al. ............. 427/387 |
| 7,071,279 B2 | * | 7/2006 | Liao .................................. 528/31 |

FOREIGN PATENT DOCUMENTS

| | | |
|---|---|---|
| JP | 5-320350 A | 12/1993 |
| JP | 8-109264 A | 4/1996 |
| JP | 8-109265 A | 4/1996 |
| JP | 8-109266 A | 4/1996 |
| JP | 9-227781 A | 9/1997 |
| JP | 9-227782 A | 9/1997 |
| JP | 9-227783 A | 9/1997 |
| JP | 3069655 B2 | 7/2000 |
| WO | WO 01/30887 A1 | 5/2001 |

OTHER PUBLICATIONS

"Poly(dimethylsilylenemethylene-co-dimethylsiloxane): A Regularly Alternating Copolymer of Poly(dimethylsiloxane) and Poly(dimethylsilylenemethylene" authored by Interrante et al. and published in Macromolecules (2001) 34, 1545-1547.*
Abstract for DE 1257434 B (Dec. 1967).*
Extended European Search Report dated Dec. 21, 2010 for Application No. 10173282.4.

* cited by examiner

*Primary Examiner* — Marc Zimmer
(74) *Attorney, Agent, or Firm* — Birch, Stewart, Kolasch & Birch, LLP

(57) ABSTRACT

The present invention provides an organopolysilmethylene represented by the following general formula (1):

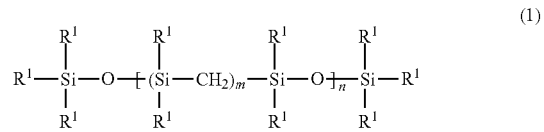

wherein $R^1$ is, independently of each other, a group selected from the group consisting of an unsubstituted or substituted monovalent hydrocarbon group having 1 to 10 carbon atoms, an alkoxy group, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group, and a hydroxy group,
m is an integer of 1 to 100, and
n is an integer of 1 to 100, and
wherein at least two out of $R^1$'s and R's are an alkenyl group.

10 Claims, 1 Drawing Sheet

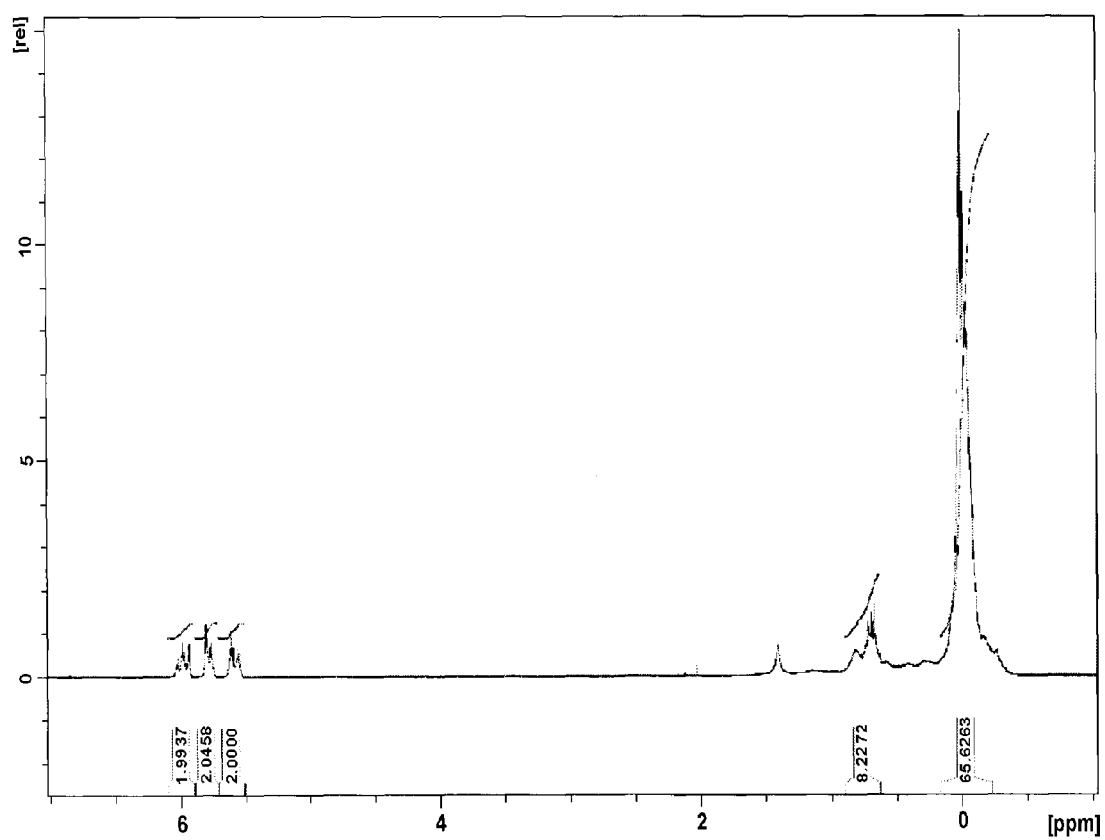

ORGANOPOLYSILMETHYLENE AND A COMPOSITION COMPRISING THE SAME

CROSS REFERENCES

This application claims the benefits of Japanese Patent Application No. 2009-191754 filed on Aug. 21, 2009, the contents of which are incorporated herein by reference.

FIELD OF THE INVENTION

The present invention relates to an addition-curable organopolysilmethylene-siloxane which yields a cured product excellent in heat resistance, mechanical strength, electrical insulation property, electrical properties and water-proof property, a composition comprising the same and a cured product thereof.

BACKGROUND OF THE INVENTION

Curable silicone rubber compositions which cure to form a silicone rubber elastomer are well known and widely used as a gasket material for electric and electronic parts, a potting material, a coating material, a shaping material such as a molding material, a wire-covering material and automobile parts, on account of good properties of the compositions such as weathering resistance, heat resistance, and electrical insulation property. Curable silicone rubber compositions have siloxane bonds which are inherent in a silicone. A siloxane bond is ionic and, therefore, the curable silicone rubber compositions cannot exert the excellent properties of silicones such as chemical resistance, for instance, acid and alkali resistance, water-proof property and permeability for gas in extremely severe environments such as a hot and humid environment.

As a countermeasure for the afore-mentioned problem, a polymer is known where a part of its siloxane bonds is a silethylene bond (Patent Literature 1) or a silphenylene bond (Patent Literature 2). However, the synthesis of these polymers and, accordingly, their mass production, are difficult and, therefore the polymers are expensive. Therefore, the polymers have been commercialized only in special applications or in special fields.

As a precursor for silicon carbide ceramics, polydiarylsilmethylenes having silmethylene bonds are known from Patent Literatures 3 to 5. These polymers are crystalline, thermoplastic silicon polymers having a high melting point and are good in heat resistance, insulation property, electrical properties, chemical resistance and water-proof property. However, the polymer is poor in processability by molding and, therefore, is not practically used. Various efforts have been made to improve the processability by molding. For instance, Patent Literature 6 describes a mixture of a polydiarylsilmethylene with a silicone polymer. Patent Literatures 7 and 8 describe mixtures of a polydiarylsilmethylene with a polyalkylsilmethylene. Patent Literature 9 describes a method for preparing a film of a polydiarylsilmethylene on a substrate where a film of disilacyclobutane is formed on a substrate and is ring-opening polymerized using fine particles of metal. However, the thermoplastic diarylsilmethylene polymer is highly crystalline and, therefore, is difficult to be synthesized. Accordingly, the diarylsilmethylene polymer is expensive and bad in processability. Therefore, research has been made to adopt the diarylsilmethylene polymer as a precursor for silicon carbide ceramics. However, a thermosetting composition is not known which takes advantages of the properties as a polymer.

PRIOR LITERATURES

Patent Literatures

Patent Literature 1: JP National Phase Publication No. 01/030887
Patent Literature 2: Japanese Patent Application Laid-Open No. Hei-5-320350
Patent Literature 3: Japanese Patent Application Laid-Open No. Hei-8-109264
Patent Literature 4: Japanese Patent Application Laid-Open No. Hei-8-109265
Patent Literature 5: Japanese Patent Application Laid-Open No. Hei-8-109266
Patent Literature 6: Japanese Patent Application Laid-Open No. Hei-9-227781
Patent Literature 7: Japanese Patent Application Laid-Open No. Hei-9-227782
Patent Literature 8: Japanese Patent Application Laid-Open No. Hei-9-227783
Patent Literature 9: Japanese Patent No. 3069655

SUMMARY OF THE INVENTION

Problems to be Solved by the Invention

The object of the present invention is to provide an addition-curable organopolysilmethylene, i.e., silicon polymer having a silmethylene bond; an organopolysilmethylene-siloxane composition which comprises an addition-curable organopolysilmethylene-siloxane and, after cured, gives a product which has a good heat resistance, electrical insulation property, water-proof property and processability by molding and low permeability for gas; and a cured product thereof.

Means to Solve the Problems

The present inventors eagerly made research to attain the afore-mentioned purposes and have succeeded in synthesizing an organopolysilmethylene-siloxane having, in a molecule, at least two addition-reactive alkenyl groups bonded to each one silicon atom and have found that an addition-curable organopolysilmethylene-siloxane composition comprising
  the organopolysilmethylene-siloxane;
  a cross-linking agent having, in a molecule, at least two hydrogen atoms bonded to each one silicon atom and selected from the group consisting of an organohydrogenpolysilmethylene and an organohydrogenpolysiloxane, and
  a catalyst of a platinum group metal
yields a cured product good in the afore-mentioned properties.

Namely, the present invention provides an organopolysilmethylene-siloxane represented by the following general formula (1):

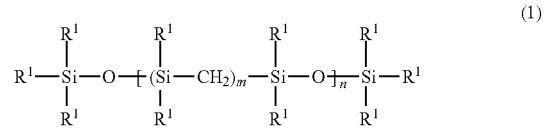

wherein $R^1$ is, independently of each other, a group selected from the group consisting of an unsubstituted or substituted monovalent hydrocarbon group having 1 to 10 carbon atoms, an alkoxy group, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group and a hydroxy group, m is an integer of 1 to 100, and n is an integer of 1 to 100, and wherein at least two out of $R^1$'s and R's are an alkenyl group.

Further, the present invention provides a method for preparing the organopolysilmethylene-siloxane represented by the afore-mentioned general formula (1), wherein an organopolysilmethylene represented by the following average compositional formula (2):

wherein $R^4$ is, independently of each other, a group selected from the group consisting of unsubstituted or substituted monovalent hydrocarbon groups having 1 to 10 carbon atoms, e and f are the numbers satisfying the equation: e+f=1.5 to 2.8, provided that $0.001 \leq f/(e+f) \leq 0.9$;

is reacted with an alkenyl group-containing silane represented by the following average compositional formula (3):

$$R^5_g R^6_h SiCl_{4-(g+h)} \quad (3)$$

wherein $R^5$ is, independently of each other, unsubstituted or substituted monovalent hydrocarbon groups having 1 to 10 carbon atoms;

$R^6$ is an alkenyl group having 2 to 10 carbon atoms;

g is an integer of 0 to 2; and h is an integer of 1 to 3, provided that a total of g and h is 1 to 3.

Furthermore, the present invention provides an organopolysilmethylene-siloxane composition comprising (A) an organopolysilmethylene represented by the afore-mentioned general formula (1), (C) a cross-linking agent having, in a molecule, at least two hydrogen atoms bonded to each one silicon atom (hereinafter referred to as an SiH group), and selected from the group consisting of an organohydrogenpolysilmethylene and an organohydrogenpolysiloxane, in such an amount that an amount of the SiH groups of the cross-linking agent is 0.1 to 5.0 mols per mol of the alkenyl group of organopolysilmethylene-siloxane (A), and (D) a catalyst of a platinum group metal in a catalytic amount; and also provides a cured product of the afore-mentioned composition.

Effects of the Invention

The organopolysilmethylene-siloxane composition of the present invention provides a cured product having excellent properties such as heat resistance, electrical insulation property, mechanical properties and optical properties. The cured product also shows low permeability for gas and excellent water-proof property and hydrolysis resistance even in extremely severe environments, whereas silicone rubbers do not show these properties. The organopolysilmethylene-siloxane composition of the present invention shows as good processability by molding as that of conventional silicone rubbers and, therefore, can be processed by conventional processing machinery such as a molding instrument. Molded products obtained from the organopolysilmethylene-siloxane composition of the present invention can be used in insulating materials, sealing materials, electric or electronic parts such as cables, packings, and connectors, automobile parts and semi-conductor devices, similarly to silicone rubbers. They can also be used for lenses or transparent sealing materials, taking advantages of its optical properties.

BRIEF DESCRIPTION IN A DRAWING

FIG. 1 shows NMR spectra of the compound prepared in Example 1.

BEST MODE OF THE INVENTION

The present invention will be described below.

(A) organopolysilmethylene-siloxane

Component (A) is an organopolysilmethylene-siloxane which has at least two alkenyl groups bonded to each one silicon atom and is represented by the following general formula (1):

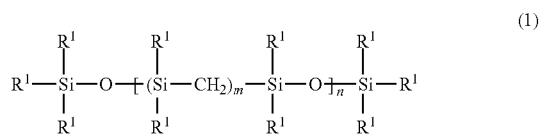

wherein m is an integer of 1 to 100, preferably 1 to 50 and n is an integer of 1 to 100, preferably 1 to 50, more preferably 1 to 20.

In formula (1), $R^1$ is, independently of each other, a group selected from the group consisting of an unsubstituted or substituted monovalent hydrocarbon group having 1 to 10 carbon atoms, an alkoxy group, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group and a hydroxy group. Examples of the monovalent hydrocarbon group include an alkyl group such as a methyl, ethyl, propyl, isopropyl, and butyl groups; a cycloalkyl group such as a cyclohexyl group; an alkenyl group such as a vinyl, allyl, 1-propenyl, 1-butenyl, 1-hexenyl, and cyclohexenyl groups; an aryl group such as a phenyl and tolyl groups; an aralkyl group such as a benzyl and 2-phenylethyl groups; and the groups where a part or whole of their hydrogen atoms bonded to each one carbon atom are replaced with a halogen atom or a cyano group, such as a chlormethyl, 3-chloropropyl, 3,3,3-trifluoropropyl, and 2-cyanoethyl groups. At least two out of $R^1$'s and R's are an alkenyl group such as a vinyl and allyl group. Inter alia, a vinyl group is preferred for easier preparation and heat resistance. Examples of $R^1$'s and R's other than the alkenyl group include a methyl and phenyl groups. Particularly, a methyl group is preferred for curing property of the composition and flexibility of the cured product. 50 Mol % or more of a total mol of $R^1$ and R is preferably a methyl group.

The organopolysilmethylene-siloxane represented by the afore-mentioned formula (1) can be prepared by reacting an organopolysilmethylene represented by the following average compositional formula (2):

wherein $R^4$ is, independently of each other, a group selected from the group consisting of unsubstituted or substituted monovalent hydrocarbon groups having 1 to 10 carbon atoms; e and f are the number satisfying the equation, e+f=1.5 to 2.8, preferably 1.8 to 2.5, more preferably 1.95 to 2.05, provided that $0.001 \leq f/(e+f) \leq 0.9$, preferably $0.005 \leq f/(e+f)$ ≦0.5, more preferably 0.005≦f/(e+f)≦0.1, with an alkenyl group-containing silane represented by the following formula (3):

$$R^5_g R^6_h SiCl_{4-(g+h)} \quad (3)$$

wherein $R^5$ is, independently of each other, a group selected from unsubstituted or substituted monovalent hydrocarbon groups having 1 to 10 carbon atoms; $R^6$ is an alkenyl group having 2 to 10 carbon atoms; g is an integer of 0 to 2; h is an integer of 1 to 3, provided that a total of g and h is 1 to 3.

Examples of $R^4$ and $R^5$ include an alkyl group such as a methyl, ethyl, propyl, isopropyl, and butyl groups; a cycloalkyl group such as a cyclohexyl group; an aryl group such as a phenyl and tolyl groups; an aralkyl group such as a benzyl and 2-phenylethyl groups; and the groups where a part or whole of their hydrogen atoms bonded to each one carbon atom are replaced with a halogen atom or a cyano group, such as a chlormethyl, 3-chloropropyl, 3,3,3-trifluoropropyl, and 2-cyanoethyl groups. $R^6$ is an alkenyl group such as a vinyl, allyl, 1-propenyl, 1-butenyl, 1-hexenyl, and cyclohexenyl group. Examples of the alkenyl group-containing silane represented by formula (3) include dimethylvinylmonochlorosialne, methyldivinylmonochlorosilane, trivinylmonochlorosialne, methylphenylvinylmonochlorosilane, methylvinylchlorosilane, phenylvinyldichlorosilane and vinyltrichlorosialne.

The present organopolysilmethylene is obtained in a method where the organopolysilmethylene of the afore-mentioned average compositional formula (2) and the alkenyl group-containing silane of formula (3) are co-hydrolyzed, or in a method where the organopolysilmethylene of average compositional formula (2) is hydrolyzed to introduce hydroxy groups bonded to each one silicon atom and, then the resulting hydroxyl groups are reacted with the silane of the general formula (3) while hydrogen chloride is eliminated. A silane which has no alkenyl group, $R^5_g SiCl_{4-g}$, can also be used together with the silane of the general formula (3).

Examples of the organopolysilmethylene-siloxane of the present invention include the following:

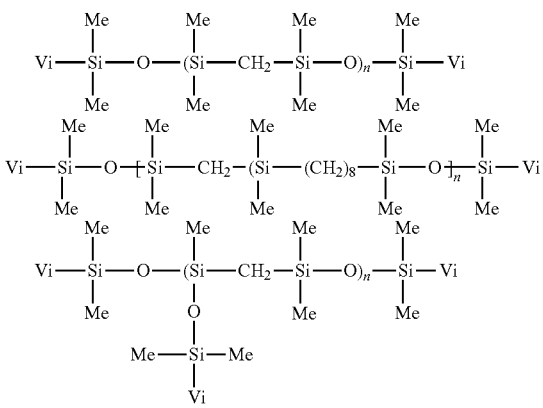

In the afore-mentioned formulas, Vi represents a vinyl group; and Me, a methyl group. n is an integer of 1 to 100, preferably 1 to 50, more preferably 1 to 20.

The present invention also provides an organopolysilmethylene-siloxane composition comprising
(A) the organopolysilmethylene-siloxane represented by the afore-mentioned general formula (1); (C) a cross-linking agent having at least two SiH groups in a molecule and selected from the group consisting of an organohydrogenpolysilmethylene and an organohydrogenpolysiloxane; and
(D) a catalyst of a platinum group metal.

The organopolysilmethylene-siloxane composition of the present invention may further comprise (B) an organopolysiloxane having at least two alkenyl groups bonded to each one silicon atom in a molecule and represented by the following average compositional formula (4).

(B) Organopolysiloxane

Component (B) is an optional component and replaces a part of the major component, organopolysilmethylene-siloxane (A). Component (B) is an organopolysiloxane which has at least two alkenyl groups bonded to each one silicon atom in a molecule and is represented by the following average compositional formula (4):

$$R^2_b SiO_{(4-b)/2} \quad (4)$$

wherein $R^2$ is, independently of each other, a group selected from the group consisting of an unsubstituted or substituted hydrocarbon group having 1 to 10 carbon atoms, an alkoxy group, a hydroxy group and $R_3SiO—$, wherein R is, independently of each other, a group selected from the group consisting of an unsubstituted or substituted monovalent hydrocarbon group having 1 to 10 carbon atoms, an alkoxy group and a hydroxy group,
at least two out of $R^2$'s and R's are an alkenyl group and
b is the number of 1.5 to 2.8, preferably 1.8 to 2.5, more preferably 1.95 to 2.05.

Examples of the monovalent hydrocarbon group include an alkyl group such as a methyl, ethyl, propyl, isopropyl, and butyl groups; a cycloalkyl group such as a cyclohexyl group; an alkenyl group such as vinyl and allyl groups; an aryl group such as phenyl and tolyl groups; an aralkyl group such as benzyl and 2-phenylethyl groups; and the groups where a part or whole of their hydrogen atoms bonded to the carbon atoms are replaced with a halogen atom or a cyano group, such as a chlormethyl, 3-chloropropyl, 3,3,3-trifluoropropyl, and 2-cyanoethyl groups. At least two out of $R^2$'s and R's are an alkenyl group such as a vinyl, allyl, 1-propenyl, 1-butenyl, 1-hexenyl and cyclohexenyl group. Inter alia, a vinyl group is preferred for easier preparation and heat resistance. Examples of $R^2$ and R other than the alkenyl group include methyl and phenyl groups. Particularly, a methyl group is preferred, because such an organopolysiloxane shows good compatibility with component (A) and curing properties and flexibility of the composition are good. Preferably, 50 mol % or more of $R^2$'s and R's is a methyl group. A part of $R^2$ or R is preferably a phenyl group for heat resistance and optical properties.

Preferred examples of the organopolysiloxane include polydimethylsiloxane having vinyl groups on both ends, copolymers having vinyl groups on both ends of polydimethylsiloxane and methylphenylsiloxane, and copolymers having vinyl groups on both ends of polydimethylsiloxane and diphenylsiloxane, as represented by the following formulas.

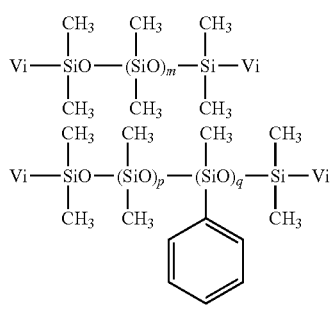

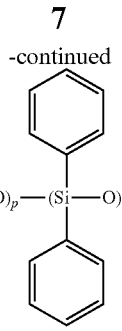

wherein m is an integer of 0 to 300, preferably 10 to 200, more preferably 50 to 150 and a total of p and q is an integer of 1 to 300, preferably 10 to 200, more preferably 50 to 150.

The present organopolysilmethylene-siloxane composition comprises 1 to 100 parts by mass of component (A) and 0 to 99 parts by mass of component (B), preferably 30 to 100 parts by mass of component (A) and 0 to 70 parts by mass of component (B), provided that a total of the amounts of components (A) and (B) is 100 parts by mass. If the amount of component (A) is less than the afore-mentioned lower limit, the organopolysilmethylene-siloxane does not exert its properties such as water resistance and optical properties.

(C) Cross-Linking Agent

Cross-linking agent (C) reacts with organopolysilmethylene-siloxane (A) and organopolysiloxane (B) to form a cross-linking bond and yield a rubber elastomer with a three dimensional network. The cross-linking agent of the present invention is selected from organohydrogenpolysilmethylenes and organohydrogenpolysiloxanes which have at least two SiH groups in a molecule.

The cross-linking agent of the present invention has at least two, preferably at least three, SiH groups in a molecule. The molecular structure of the cross-linking agent is not particularly limited and may be any of, for instance, linear, cyclic or branched structure or three dimensional networks, e.g., resin. The preferred cross-linking agent is an organohydrogenpolysilmethylene or organohydrogenpolysiloxane which has 2 to 200, preferably 3 to 100, silicon atoms in a molecule and is liquid at 25 degrees C. Particularly, an organohydrogenpolysiloxane is preferred because its preparation is easy and its molecular structure is selectable.

Particularly, preference is given to the organohydrogenpolysiloxane represented by the following average compositional formula (5):

$$R^3_c H_d SiO_{(4-c-d)/2} \qquad (5)$$

wherein $R^3$ is, independently of each other, a group selected from the group consisting of an unsubstituted or substituted monovalent hydrocarbon group having 1 to 10 carbon atoms, alkoxy groups and a hydroxy group, c and d are the numbers satisfying the following equations $0.7 \leq c \leq 2.1$, $0.001 \leq d \leq 1.0$, and $0.8 \leq c+d \leq 3.0$, preferably $1.0 \leq c \leq 2.0$, $0.01 \leq d \leq 1.0$, and $1.5 \leq c+d \leq 2.5$. Inter alia, the organohydrogenpolysiloxane has 2 to 200 siloxane units.

Examples of the organohydrogenpolysiloxane represented by the afore-mentioned average compositional formula (5) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both ends blocked with trimethylsiloxy groups, copolymers of dimethylsiloxane and methylhydrogensiloxane with both ends blocked with trimethylsiloxy groups, dimethylpolysiloxane with both ends blocked with dimethylhydrogensiloxy groups, copolymers of dimethylsiloxane and methylhydrogensiloxane with both ends blocked with dimethylhydrogensiloxy groups, copolymers of methylhydrogensiloxane and diphenylsiloxane with both ends blocked with trimethylsiloxy groups, copolymers of methylhydrogensiloxane, diphenylsiloxane and dimethylsiloxane with both ends blocked with trimethylsiloxy groups, copolymers of methylhydrogensiloxane, methylphenylsiloxane and dimethylsiloxane with both ends blocked with trimethylsiloxy groups, copolymers of methylhydrogensiloxane, dimethylsiloxane and diphenylsiloxane with both ends blocked with dimethylhydrogensiloxy groups, copolymers of methylhydrogensiloxane, dimethylsiloxane and methylphenylsiloxane with both ends blocked with dimethylhydrogensiloxy groups, copolymers of $(CH_3)_2HSiO_{1/2}$ unit, $(CH_3)_3SiO_{1/2}$ unit and $SiO_{4/2}$ unit, copolymers of $(CH_3)_2HSiO_{1/2}$ unit and $SiO_{4/2}$ unit, and copolymers of $(CH_3)_2HSiO_{1/2}$ unit, $SiO_{4/2}$ unit and $(C_6H_5)_3SiO_{1/2}$ unit.

Component (C) is preferably blended in such an amount that an amount of the SiH groups in component (C) is 0.1 to 5.0 mols, preferably 0.5 to 4.0 mols, more preferably 0.8 to 3.0 mols, per mol of the alkenyl groups of (A) or (A) and (B). Below the afore-mentioned lower limit, cross-link density of the cured product which is obtained from the composition of the present invention is so low that mechanical strength is not satisfactory; and heat resistance is also adversely affected, which is not preferred. Above the afore-mentioned upper limit, foaming occurs in a cured product due to dehydrogenation; the remaining SiH groups may change properties of the cured product with time; and further heat resistance of the cured product may adversely be affected, which is not preferred. The amount of the alkenyl group of component (A) is preferably 50 to 100 mol %, more preferably 80 to 100 mol %, relative to the amount of the alkenyl groups of components (A) and (B).

(D) Catalyst of a Platinum Group Metal (D) A catalyst of a platinum group metal promotes an addition, i.e., hydrosilylation, of components (A) and (B) to component (C). As the catalyst, use may be made of known catalysts of platinum group metals. Platinum or platinum compounds are preferred. Examples of the catalyst of a platinum group metal include platinum black, platinum (II) chloride, chloroplatinic acid, alcohol-modified chloroplatinic acid, and complexes of chloroplatinic acid with an olefin, an aldehyde, a vinylsiloxane or an acetylenic alcohol.

The catalyst of a platinum group metal may be blended in a catalytically effective amount. The amount may be properly increased or decreased, depending upon a desired curing rate. The amount is not particularly restricted, but may preferably be 0.1 to 1000 ppm by mass, more preferably 1 to 200 ppm by mass, reduced to a platinum group metal, relative to 100 parts by mass of component (A) or a total of components (A) and (B).

Other Components

The organopolysilmethylene-siloxane composition of the present invention may comprise, in addition to the afore-mentioned components (A) to (D), a variety of functional additives, for instance, reinforcing fillers, heat stabilizers, antioxidants, ultraviolet rays absorbers, photo stabilizers, electrically conductive agents, agents for adhesiveness, coloring agents, lubricants, plasticizers, anti-static agents, and flame retardants as long as the purposes and effects of the present invention are not impaired. For instance, examples of the additives include reinforcing fillers such as fumed silica and precipitated silica; fillers such as diatom earth, graphite, aluminum oxide, mica, clay, carbon, titanium oxide and glass beads; electrically conductive materials; pigments; lubricants; and polydimethylsiloxane as a mold-release agent.

The organopolysilmethylene-siloxane composition of the present invention can be obtained by blending the aforementioned components in a planetary mixer or Shinagawa mixer according to any conventional methods. The curing conditions for the organopolysilmethylene composition of the present invention may be same as those for known addition-curable silicone rubber compositions. For instance, the composition cures satisfactorily even at ambient temperature, but the composition may be heated, if needed. In the latter case, the composition is heated at 60 to 150 degrees C., particularly 80 to 120 degrees C., for 5 to 120 minutes, particularly 10 to 60 minutes.

The cured product of the organopolysilmethylene-siloxane composition of the present invention is excellent in mechanical strength, heat resistance, electrical insulation property, water-proof property, and optical properties; low in permeability for gas; and is most suitable as optical materials which particularly need transparency, such as LED lenses and sealing materials for LED.

EXAMPLES

The present invention will be described below more in detail by referring to the Examples and Comparative Examples, but shall not be limited thereto. In the following description, "part" or "parts" means part or parts by mass; Me, a methyl group; and Vi, a vinyl group.

Example 1

Preparation of an Alkenyl Group-Containing Organopolysilmethylene (A1)

1540 Grams (4.64 mol, 90 mol %) of chlorine-containing silmethylene of the following formula (6), and 54.2 grams (0.45 mol, 10 mol %) of dimethylvinylmonochlorosilane of the following formula (7) were dissolved in 1000 grams of xylene and added dropwise at a temperature of 60 degrees C. to a solvent mixture composed of 600 grams of water and 300 grams of xylene to hydrolyze. Then, the reaction mixture was aged at room temperature for 3 hours, the formed acid was separated and removed, and the organic phase was washed with water and subjected to azeotropic dehydration at 140 degrees C.

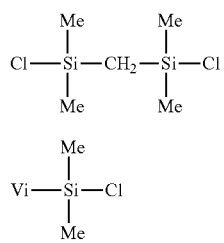

To this alkenyl group-containing polysilmethylene was added 0.2 gram of KOH to alkali polymerize at 140 degrees C. for 10 hours. Then, the reaction mixture was neutralized, filtered and, then, stripped at 160 degrees C./5 mm Hg for 30 minutes. The product obtained was analyzed by $^1$H-NMR and was found to be organopolysilmethylene-siloxane (referred to as A1) represented by the following formula (8):

The NMR spectra of A1 are shown in FIG. 1 (NMR: JNM-LA300WB ex JOEL, 300 MHz, $^1$H-NMR)

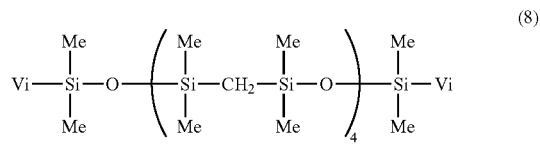

Example 2

Preparation of an Alkenyl Group-Containing Organopolysilmethylene (A2)

260.3 Grams (0.335 mol, 67 mol %) of the chlorine-containing silmethylene of the following formula (9) and 19.9 grams (0.165 mol, 33 mol %) of the dimethylvinylmonochlorosilane of the afore-mentioned formula (7) were dissolved in 200 grams of xylene and added dropwise at a temperature of 60 degrees C. to a solvent mixture composed of 200 grams of water and 100 grams of xylene to hydrolyze, as in Example 1. Then, the reaction mixture was aged at room temperature for 5 hours, the formed acid was separated and removed, and the organic phase was washed with water and subjected to azeotropic dehydration at 140 degrees C. To this alkenyl group-containing polysilmethylene was added 0.2 gram of KOH to alkali polymerize at 140 degrees C. for 10 hours. Then, the reaction mixture was neutralized, filtered and, then, stripped at 160 degrees C./5 mm Hg for 30 minutes to obtain organopolysilmethylene-siloxane (A2) represented by the following formula (10).

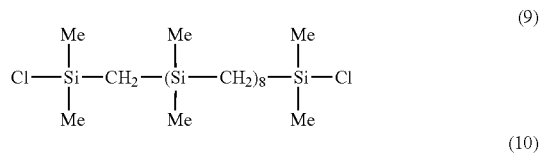

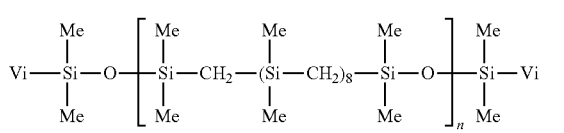

(Average of n: 4)

Example 3

To 100 grams of the alkenyl group-containing organopolysilmethylene-siloxane (A1) prepared in Example 1 were added 34.7 grams of the SiH group-containing polysiloxane (C1) (Si—H/Si-Vi ratio in mol=0.36) and, 0.1 gram of chloroplatinic acid solution in alcohol (D1) as a platinum catalyst, where a platinum content is 2 mass %, corresponding to 20 ppm of a platinum content, and mixed. The resulting mixture was poured into a mold of 130 mm long×170 mm wide×2 mm deep, placed in a desiccator, defoamed under a reduced pressure of 10 Torr for 10 minutes, and heat cured at 150 degrees C. for 1 hour to form a cured product of the organopolysilmethylene. The properties of the cured product are shown in Table 1.

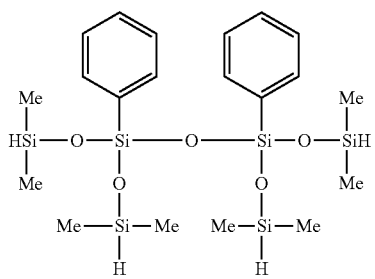

(11)

Example 4

To 100 grams of the alkenyl group-containing organopolysilmethylene-siloxane (A2) prepared in Example 2 were added 25.7 grams of the SiH group-containing polysiloxane (C1) represented by the afore-mentioned formula (11), where Si—H/Si-Vi ratio in mol=3, and 0.1 gram of platinum catalyst (D1), corresponding to 20 ppm of a platinum content, and mixed. The resulting mixture was heat cured at 150 degrees C. for one hour, as in Example 1, to form a cured product of the organopolysilmethylene-siloxane. The properties of the product are shown in Table 1.

Example 5

To 70 grams of the alkenyl group-containing organopolysilmethylene-siloxane (A2) prepared in Example 2 were added 30 grams of the copolymer having vinyl groups on both ends of a dimethylpolysiloxane and a diphenylpolysiloxane (B1) represented by the following formula (12), 20.1 grams of the SiH group-containing polysiloxane (C1) represented by the afore-mentioned formula (11), where Si—H/Si-Vi ratio in mol=3, and 0.1 gram of platinum catalyst (D1), corresponding to 20 ppm of a platinum content, and mixed. Then, the resulting mixture was heat cured at 150 degrees C. for one hour, as in Example 1, to form a cured product of the organopolysilmethylene-organopolysiloxane. The properties of the product are shown in Table 1.

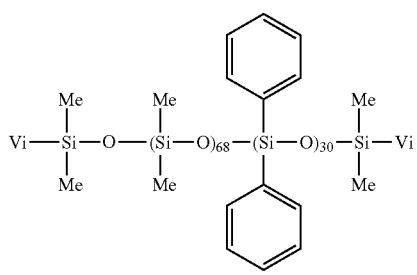

(12)

Comparative Example

To 100 grams of the copolymer of dimethylpolysiloxane and diphenylpolysiloxane having vinyl groups on both ends (B1) represented by the afore-mentioned formula (12) were added 7 grams of the SiH group-containing polysiloxane (C1) represented by the afore-mentioned formula (11), where Si—H/Si-Vi ratio in mol=3, and 0.1 gram of platinum catalyst (D1), corresponding to 20 ppm of a platinum content, and mixed. Then the resulting mixture was heat cured at 150 degrees C. for one hour, as in Example 1 to form a cured product of the organopolysiloxane. The properties of the product are shown in Table 1.

Properties of each cured product above-described were evaluated in the following methods. Results are shown in Table 1.

(1) Appearance of a cured product was observed visually to evaluate discoloration and transparency.

(2) Hardness was determined with a durometer of type A which is in accordance with JIS K6253.

(3) A tensile strength, an elongation, a density, a volume resistivity, an electrical breakdown strength, a specific inductive and a dielectric tangent were determined according to JIS K6249.

(4) Water vapor permeability was determined according to JIS Z0208.

TABLE 1

| Properties after cured | Example 3 | Example 4 | Example 5 | Comparative Example |
|---|---|---|---|---|
| Appearance | Colorless and transparent | Colorless and transparent | Colorless and transparent | Colorless and transparent |
| Hardness(Type A) | 80 | 40 | 30 | 20 |
| Tensile Strength in MPa | 3 | 5 | 2 | 0.3 |
| Elongation in % | 30 | 200 | 300 | 150 |
| Density | 1.07 | 1.07 | 1.07 | 1.07 |
| Water Vapor Permeability in $g/m^2 \cdot 24$ hr | 20 | 21 | 30 | 50 |
| Volume Resistivity in $T\Omega \cdot cm$ | 100 | 30 | 30 | 5 |
| Electrical Breakdown Strength in KV/mm | 30 | 25 | 23 | 20 |
| Specific Inductive (50 Hz) | 3.00 | 2.98 | 2.88 | 2.80 |
| Dielectric Tangent (50 Hz) | 0.001 | 0.001 | 0.001 | 0.001 |
| Hardness after heated at 150 degrees C. for 1000 hrs | 85 | 45 | 35 | 25 |

As seen in Table 1, the cured products of Examples 3 to 5 are transparent, excellent in mechanical strength and less permeable for water vapor. The cured product of the Comparative Example is worse in mechanical strength and water vapor permeability is larger.

INDUSTRIAL APPLICABILITY

The organopolysilmethylene-siloxane composition of the present invention provides a cured product excellent in mechanical properties, heat resistance, electrical insulation property, water-proof property, and optical properties; low in permeability for gas; and is most suitable as optical materials which particularly need transparency, such as LED lenses and sealing materials for LED.

The invention claimed is:

1. An organopolysilmethylene-siloxane represented by the following general formula (1):

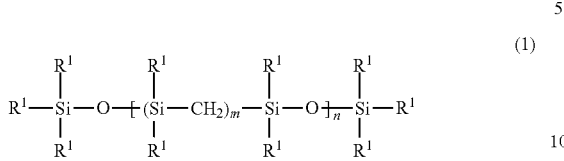

wherein
  $R^1$ is, independently of each other, a group selected from the group consisting of an unsubstituted or substituted monovalent hydrocarbon group having 1 to 10 carbon atoms, an alkoxy group having 1 to 10 carbon atoms, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms and a hydroxy group,
  m is an integer of 1 to 100, and
  n is an integer of 1 to 100, and
wherein at least two out of $R^1$'s and R's are an alkenyl group.

2. A method for preparing the organopolysilmethylene-siloxane described in claim 1, wherein an organopolysilmethylene represented by the following average compositional formula (2):

wherein $R^4$ is, independently of each other, a group selected from the group consisting of unsubstituted or substituted monovalent hydrocarbon groups having 1 to 10 carbon atoms, and e and f are the numbers satisfying the equation: e+f=1.5 to 2.8, provided that $0.001 \leq f/(e+f) \leq 0.9$;

is reacted with an alkenyl group-containing silane represented by the following average compositional formula (3):

wherein $R^5$ is, independently of each other, unsubstituted or substituted monovalent hydrocarbon groups having 1 to 10 carbon atoms; $R^6$ is an alkenyl group having 2 to 10 carbon atoms; g is an integer of 0 to 2; and h is an integer of 1 to 3, provided that a total of g and h is 1 to 3.

3. An organopolysilmethylene-siloxane composition comprising
  (A) an organopolysilmethylene-siloxane according to claim 1,
  (C) a cross-linking agent having, in a molecule, at least two hydrogen atoms bonded to each one silicon atom to constitute SiH groups, and selected from the group consisting of an organohydrogenpolysilmethylene and an organohydrogenpolysiloxane, in such an amount that an amount of the SiH groups of the cross-linking agent is 0.1 to 5.0 mols per mol of the alkenyl group of organopolysilmethylene (A), and
  (D) a catalyst of a platinum group metal in a catalytic amount.

4. The organopolysilmethylene-siloxane composition according to claim 3, wherein the composition further comprises
  (B) an organopolysiloxane represented by the following average compositional formula (4):

wherein $R^2$ is, independently of each other, a group selected from the group consisting of an unsubstituted or substituted hydrocarbon group having 1 to 10 carbon atoms, an alkoxy group having 1 to 10 carbon atoms, a hydroxyl group, and $R_3SiO$—, wherein
    R is, independently of each other, a group selected from the group consisting of an unsubstituted or substituted monovalent hydrocarbon group having 1 to 10 carbon atoms, an alkoxy group having 1 to 10 carbon atoms, and a hydroxy group,
    at least two out of $R^2$'s and R's are an alkenyl group and b is the number of 1.5 to 2.8; and
  wherein cross-linking agent (C) is present in such an amount that an amount of the SiH groups of the cross-linking agent is 0.1 to 5.0 mols per mol of the alkenyl groups of organopolysilmethylene-siloxane (A) and organopolysiloxane (B).

5. The organopolysilmethylene-siloxane composition according to claim 4, comprising:
  (A) 30 to 100 parts by mass of the organopolysilmethylene represented by the following general formula (1):

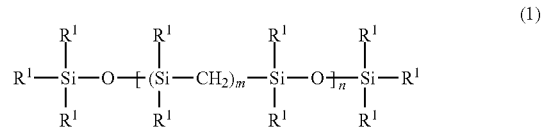

wherein $R^1$ is, independently of each other, a group selected from the group consisting of an unsubstituted or substituted monovalent hydrocarbon group having 1 to 10 carbon atoms, an alkoxy group having 1 to 10 carbon atoms, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms, and a hydroxy group, m is an integer of 1 to 100, and n is an integer of 1 to 100, and wherein at least two out of $R^1$'s and R's are an alkenyl group,
  (B) 0 to 70 parts by mass of the organopolysiloxane represented by the following average compositional formula (4):

wherein $R^2$ is, independently of each other, a group selected from the group consisting of an unsubstituted or substituted hydrocarbon group having 1 to 10 carbon atoms, an alkoxy group having 1 to 10 carbon atoms, a hydroxyl group and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms, and a hydroxy group, at least two out of $R^2$'s and R's are an alkenyl group and b is the number of 1.5 to 2.8,
  provided that a total amount of (A) and (B) is 100 parts by mass, (C) a cross-linking agent having, in a molecule, at least two hydrogen atoms bonded to each one silicon atom to constitute SiH groups, and selected from the group consisting of an organohydrogenpolysilmethylene and an organohydrogenpolysiloxane, in such an amount that an amount of the SiH groups is 0.1 to 5.0 mols per mol of the alkenyl groups of (A) organopolysilmethylene and (B) organopolysiloxane, and (D) a catalytic amount of a catalyst of a platinum group metal.

6. The organopolysilmethylene-siloxane composition according to any one of claims 3 to 5, wherein the cross-linking agent (C) is an organohydrogenpolysiloxane having, in a molecule, at least two hydrogen atoms bonded to each one silicon atom and represented by the following average compositional formula (5):

wherein $R^3$ is, independently of each other, a group selected from the group consisting of an unsubstituted or substituted monovalent hydrocarbon group having 1 to 10 carbon atoms, an alkoxy group having 1 to 10 carbon atoms, and a hydroxy group, and c and d are the numbers satisfying the following equations $0.7 \leq c \leq 2.1$, $0.001 \leq d \leq 1.0$, and $0.8 \leq c+d \leq 3.0$.

7. A cured product formed by curing an organopolysilmethylene-siloxane composition comprising (A) an organopolysilmethylene-siloxane represented by the following general formula (1):

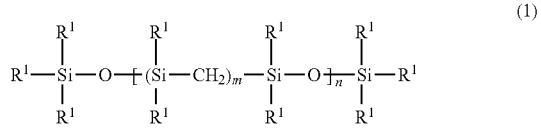

wherein $R^1$ is, independently of each other, a group selected from the group consisting of an unsubstituted or substituted monovalent hydrocarbon group having 1 to 10 carbon atoms, an alkoxy group having 1 to 10 carbon atoms, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms, and a hydroxy group, m is an integer of 1 to 100, and n is an integer of 1 to 100, and wherein at least two out of $R^1$'s and R's are an alkenyl group, (C) a cross-linking agent having, in a molecule, at least two hydrogen atoms bonded to each one silicon atom to constitute SiH groups, and selected from the group consisting of an organohydrogenpolysilmethylene and an organohydrogenpolysiloxane, in such an amount that amount of the SiH groups of the cross-linking agent is 0.1 to 5.0 mols per mol of the alkenyl group of organopolysilmethylene (A), and (D) a catalyst of a platinum group metal in a catalytic amount.

8. The cured product according to claim 7, wherein the organopolysilmethylene-siloxane composition further comprises (B) an organopolysiloxane represented by the following average compositional formula (4):

wherein
$R^2$ is, independently of each other, a group selected from the group consisting of an unsubstituted or substituted hydrocarbon group having 1 to 10 carbon atoms, an alkoxy group having 1 to 10 carbon atoms, a hydroxyl group, and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms, and a hydroxy group,
at least two out of $R^2$'s and R's are an alkenyl group and b is the number of 1.5 to 2.8; and
wherein cross-linking agent (C) is present in such an amount that an amount of the SiH groups of the cross-linking agent is 0.1 to 5.0 mols per mol of the alkenyl groups of organopolysilmethylene-siloxane (A) and organopolysiloxane (B).

9. A cured product formed by curing an organopolysilmethylene-siloxane composition comprising:

(A) 30 to 100 parts by mass of the organopolysilmethylene-siloxane represented by the following general formula (1):

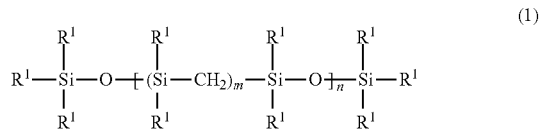

wherein $R^1$ is, independently of each other, a group selected from the group consisting of an unsubstituted or substituted monovalent hydrocarbon group having 1 to 10 carbon atoms, an alkoxy group having 1 to 10 carbon atoms, a hydroxy group, $R_3SiCH_2$— and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms, and a hydroxy group, m is an integer of 1 to 100, and n is an integer of 1 to 100, and wherein at least two out of $R^1$'s and R's are an alkenyl group, (B) 0 to 70 parts by mass of the organopolysiloxane represented by the following average compositional formula (4):

wherein $R^2$ is, independently of each other, a group selected from the group consisting of an unsubstituted or substituted hydrocarbon group having 1 to 10 carbon atoms, an alkoxy group having 1 to 10 carbon atoms, a hydroxyl group, and $R_3SiO$—, wherein R is, independently of each other, a group selected from the group consisting of an unsubstituted or substituted monovalent hydrocarbon group having 1 to 10 carbon atoms, an alkoxy group having 1 to 10 carbon atoms, and a hydroxy group, at least two out of $R^2$'s and R's are an alkenyl group and b is the number of 1.5 to 2.8,
provided that a total amount of (A) and (B) is 100 parts by mass, (C) a cross-linking agent having, in a molecule, at least two hydrogen atoms bonded to each one silicon atom to constitute SiH groups, and selected from the group consisting of an organohydrogenpolysilmethylene and an organohydrogenpolysiloxane, in such an amount that an amount of the SiH groups is 0.1 to 5.0 mols per mol of the alkenyl groups of (A) organopolysilmethylene and (B) organopolysiloxane, and (D) a catalytic amount of a catalyst of a platinum group metal.

10. The cured product according to claim 9, wherein the cross-linking agent (C) is an organohydrogenpolysiloxane having, in a molecule, at least two hydrogen atoms bonded to each one silicon atom and represented by the following average compositional formula (5):

$$R^3{}_c H_d SiO_{(4-c-d)/2} \tag{5}$$

wherein $R^3$ is, independently of each other, a group selected from the group consisting of an unsubstituted or substituted monovalent hydrocarbon group having 1 to 10 carbon atoms, an alkoxy group having 1 to 10 carbon atoms, and a hydroxy group, and c and d are the numbers satisfying the following equations $0.7 \leq c \leq 2.1$, $0.001 \leq d \leq 1.0$, and $0.8 \leq c+d \leq 3.0$.

* * * * *